(12) United States Patent
Gammill

(10) Patent No.: US 10,196,027 B2
(45) Date of Patent: *Feb. 5, 2019

(54) CLAMPING ARRANGEMENT FOR SECURING AN AIRBAG TO AN INFLATOR

(71) Applicant: AUTOLIV ASP, INC., Ogden, UT (US)

(72) Inventor: Kurt Gammill, Layton, UT (US)

(73) Assignee: AUTOLIV ASP, INC., Ogden, UT (US)

(*) Notice: Subject to any disclaimer, the term of this patent is extended or adjusted under 35 U.S.C. 154(b) by 388 days.

This patent is subject to a terminal disclaimer.

(21) Appl. No.: 14/972,554

(22) Filed: Dec. 17, 2015

(65) Prior Publication Data

US 2017/0174165 A1 Jun. 22, 2017

(51) Int. Cl.
B60R 21/217 (2011.01)
B60R 21/201 (2011.01)
B60R 21/213 (2011.01)
B60R 21/262 (2011.01)

(52) U.S. Cl.
CPC ........ B60R 21/201 (2013.01); B60R 21/2171 (2013.01); B60R 21/213 (2013.01); B60R 21/262 (2013.01)

(58) Field of Classification Search
CPC .. B60R 21/2171; B60R 21/201; B60R 21/213
USPC .............................. 248/74.1–74.3
See application file for complete search history.

(56) References Cited

U.S. PATENT DOCUMENTS

| 931,706 | A | 8/1909 | Stevens |
| 1,700,451 | A | 1/1929 | Ronci |
| 2,614,304 | A | 10/1952 | Oetiker |
| 2,835,954 | A | 5/1958 | Dahl |
| 3,454,996 | A | 7/1969 | Tetzlaff |
| 3,905,623 | A | 9/1975 | Cassel |
| 6,325,338 | B1 | 12/2001 | Del Re et al. |
| 6,783,148 | B2 | 8/2004 | Henderson |
| 8,007,000 | B2 | 8/2011 | Gammill et al. |
| 8,215,664 | B2 * | 7/2012 | Arima ................ B60R 21/26 280/728.2 |
| 8,226,117 | B2 | 7/2012 | Honold et al. |
| 8,505,962 | B2 * | 8/2013 | Henriksson ............ F16L 33/02 280/728.2 |

(Continued)

FOREIGN PATENT DOCUMENTS

| CN | 101112884 A | 1/2008 |
| DE | 19856382 A1 | 6/2000 |

(Continued)

OTHER PUBLICATIONS

International Search Report and Written Opinion, ISA/US, corresponding to International Application No. PCT/US2016/060512, dated Feb. 2, 2017.

Primary Examiner — Ruth Ilan
(74) Attorney, Agent, or Firm — Stephen T. Olson; Harness, Dickey & Pierce, P.L.C.

(57) ABSTRACT

A clamping arrangement for an inflatable restraint of a motor vehicle includes a base member and a retention member. The base member has a partially cylindrical shape. The partially cylindrical shape extends circumferentially through no more than 180°. The retention member cooperates with the base member to define a circular opening.

24 Claims, 4 Drawing Sheets

(56) References Cited

U.S. PATENT DOCUMENTS

| | | | |
|---|---|---|---|
| 8,764,051 B2* | 7/2014 | Fischer | B60R 21/2171 280/728.2 |
| 2001/0026063 A1* | 10/2001 | Yokota | B60R 21/205 280/732 |
| 2002/0104198 A1 | 8/2002 | Craig | |
| 2003/0005554 A1* | 1/2003 | Nagayasu | F16L 3/12 24/17 AP |
| 2003/0140462 A1 | 7/2003 | Yuzuriha et al. | |
| 2004/0046375 A1 | 3/2004 | Lincoln et al. | |
| 2007/0022578 A1 | 2/2007 | Crockett et al. | |
| 2009/0152838 A1* | 6/2009 | Robins | B60R 21/2171 280/728.2 |
| 2012/0205499 A1* | 8/2012 | Shelton | F16L 3/1091 248/62 |
| 2012/0217354 A1* | 8/2012 | Walraven | F16L 3/1025 248/74.1 |
| 2012/0274053 A1* | 11/2012 | Fischer | B60R 21/213 280/728.2 |
| 2016/0288760 A1* | 10/2016 | Jinnai | B60R 21/23138 |

FOREIGN PATENT DOCUMENTS

| | | | | |
|---|---|---|---|---|
| DE | 102008056946 A1 | 5/2010 | | |
| EP | 501287 A2 | 9/1992 | | |
| EP | 1245891 A1 | 10/2002 | | |
| GB | 541613 A | 12/1941 | | |
| KR | 20070086476 A | 8/2007 | | |
| WO | 200461355 A1 | 7/2004 | | |
| WO | 200580145 A1 | 9/2005 | | |
| WO | 200674671 A1 | 7/2006 | | |
| WO | WO-2009043583 A1 * | 4/2009 | | B60R 21/2171 |

\* cited by examiner

CLAMPING ARRANGEMENT FOR SECURING AN AIRBAG TO AN INFLATOR

FIELD

The present teachings generally relate to a clamping arrangement. More particularly, the present teachings relate to a clamping arrangement for securing an airbag to an inflator.

BACKGROUND

This section provides background information related to the present disclosure which is not necessarily prior art.

Various passive and active automotive occupant restraint systems are known for enhancing occupant protection in the event of a vehicle impact. Passive systems are deployed with no action required by the occupant and include inflatable restraints or airbags for frontal and side impacts, for example. Airbags are inflated with a pressurized source of gas delivered from an inflator in response to predetermined vehicle conditions.

The high pressure under which an airbag must be inflated requires a secure and reliable connection between the airbag and the inflator. Various clamps have been employed to resist separating forces resulting from the need to inflate an airbag within milliseconds of a sensed vehicle condition, such as a collision or impending collision. Many known clamps must be passed over an end of an inflator. Other known clamps are expensive and/or associated with significant manufacturing waste.

While known clamping arrangements for securing an airbag to an inflator have generally proven to be acceptable for their intended uses, there is a continuous need for improvement in the art.

SUMMARY

This section provides a general summary of the disclosure, and is not a comprehensive disclosure of its full scope or all of its features.

In accordance with one particular aspect, the present teachings provide a clamping arrangement for an inflatable restraint of a motor vehicle including a base member and a retention member. The base member has a partially cylindrical shape. The partially cylindrical shape extends circumferentially through no more than 180°. The retention member cooperates with the base member to define a circular opening.

In accordance with another particular aspect, the present teachings provide an arrangement for securing an airbag to an inflator and for mounting the airbag and inflator to a motor vehicle. The arrangement includes a mounting bracket and a retention member. The mounting bracket is adapted for attachment to the motor vehicle and has a partially cylindrical shape extending through no more than 180°. The retention member includes first and second ends secured to the mounting bracket. The retention member and the mounting bracket cooperate to define a circular opening for receiving the airbag and the inflator.

In accordance with yet another particular aspect, the present teachings provide an inflatable restraint having an airbag, an inflator and a combined clamping and mounting arrangement. The airbag defines an inflatable cavity having a cylindrical portion in fluid communication with the inflatable cavity. The inflator is operative for delivering an inflatable gas to the airbag and includes a tubular portion inserted into the cylindrical portion of the airbag. The combined clamping and mounting arrangement secures the airbag to the inflator and connects the inflatable restraint to the motor vehicle. The arrangement includes a base member and a retention member. The base member is disposed adjacent the cylindrical portion of the airbag and partially circumferentially surrounds the cylindrical portion of the airbag and the tubular portion of the inflator. The retention member includes first and second ends secured to the base member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that the example embodiment should not be construed to limit the scope of the present disclosure. Well-known processes, well-known device structures, and well-known technologies are not described herein in detail.

Figure 1:
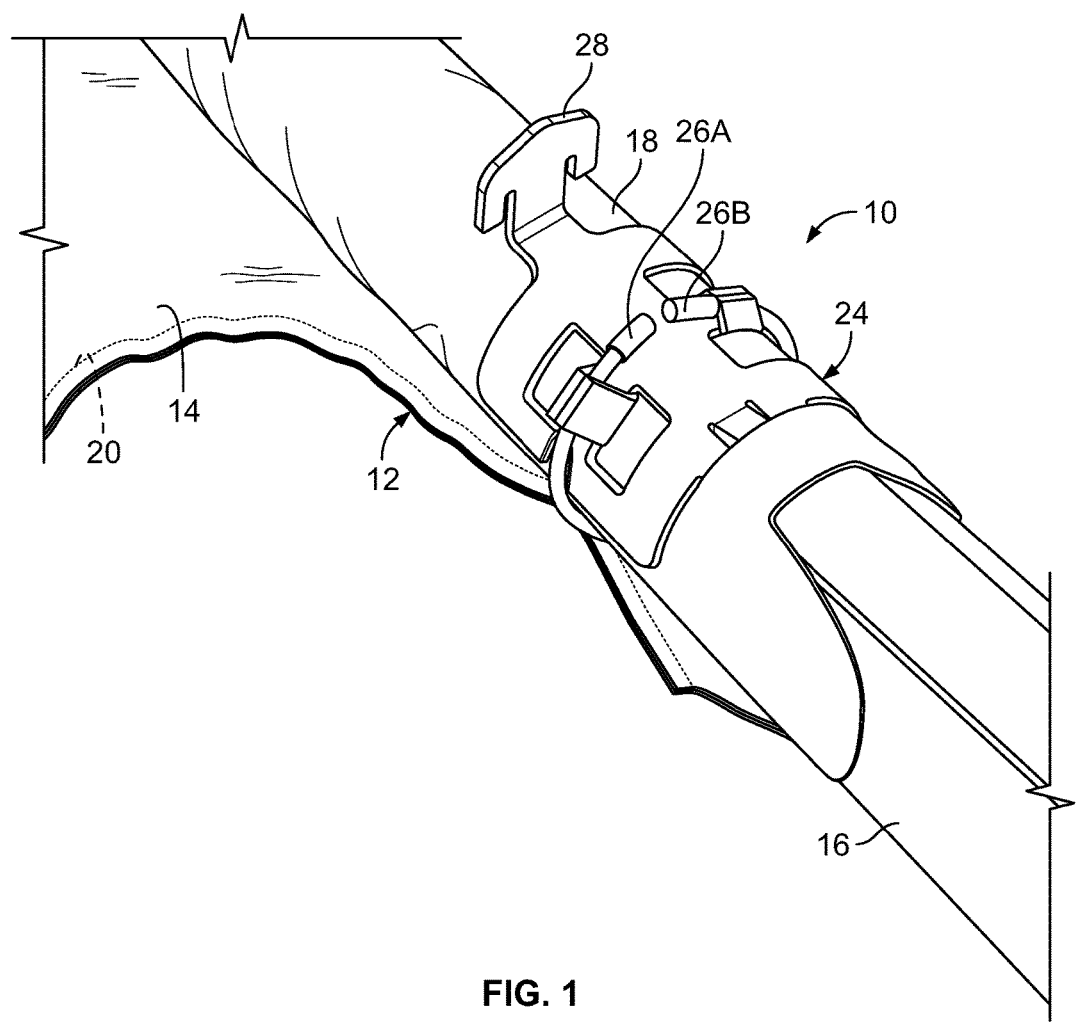
FIG. 1 is a perspective view of a clamping arrangement according to the present teachings, the clamping arrangement incorporated into an inflatable restraint and securing an airbag to an inflator.
Figure 2:
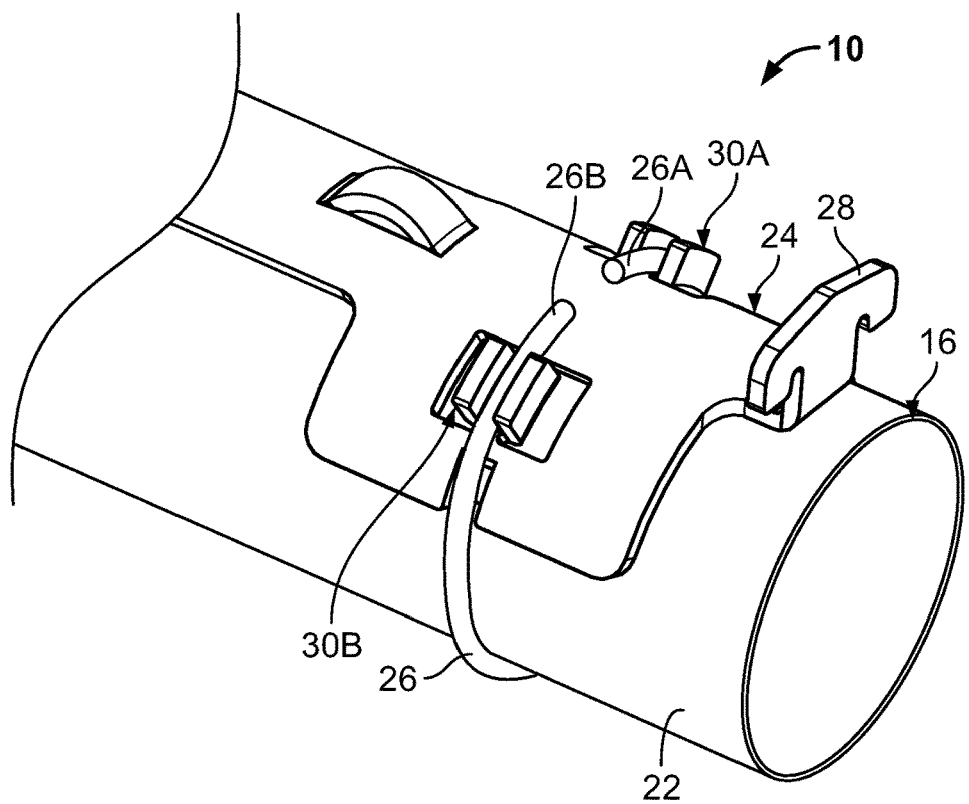
FIG. 2 is an enlarged perspective view similar to FIG. 1, illustrated without the airbag.
Figure 3:
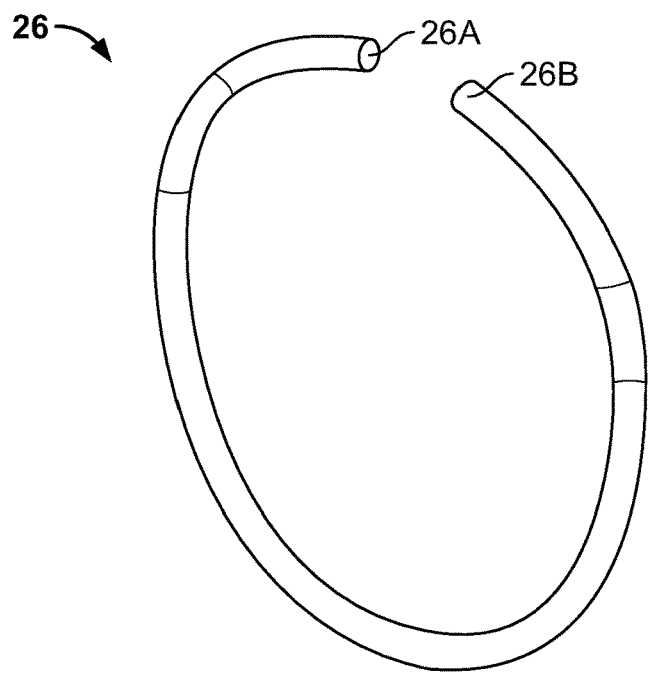
FIG. 3 is a perspective view of a clamp hoop of the clamping arrangement of FIG. 1.

With reference to FIGS. 1 through 3 of the drawings, a clamping arrangement in accordance with the present teachings is illustrated and identified at reference character 10. As will become more apparent below, the clamping arrangement 10 may be a combined clamping and mounting arrangement for both clamping an airbag to an inflator and securing the resulting inflatable restraint to a motor vehicle. Various adaptations of the present teachings are shown throughout the drawings.

Figure 1A:
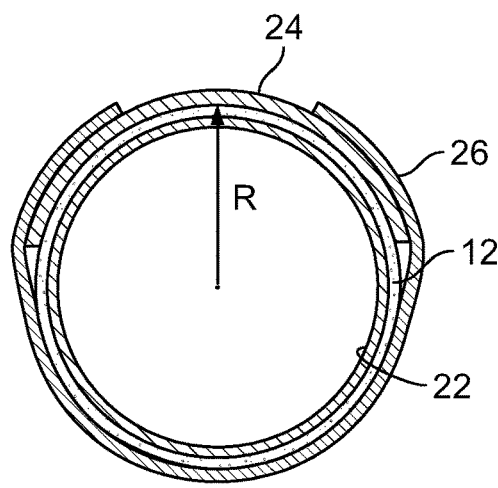
FIG. 1A is a simplified cross-sectional view taken through the clamping arrangement of FIG. 1.

With particular reference to FIGS. 1 and 1A, the clamping arrangement 10 is shown incorporated into an inflatable restraint 12 for securing an airbag 14 to an inflator 16. Insofar as the present teachings are concerned, the airbag 14 and inflator 16 shown in the drawings will be understood to be conventional in construction and operation. The airbag 14 shown may be particularly adapted for use as a side airbag and may include a cylindrical inlet portion 18 in fluid communication with an inflatable cavity 20. A tubular portion 22 of the inflator 16 may be inserted into the cylindrical inlet portion 18. It will be understood that the present teachings may be readily adapted for use with various airbags and inflators and that the scope of the present teachings is not limited to the exemplary structures illustrated.

The clamping arrangement 10 of the present teachings is illustrated to generally include a base member or mounting member 24 and a retention member 26. In the embodiment illustrated, the base member 24 may be a mounting bracket and may serve the dual functions of securing the inflator 16 to the airbag 14 and attaching the inflatable restraint 12 to the motor vehicle. The structure of the base member 24 that cooperates with the vehicle to secure the inflatable restraint 12 to the vehicle will be understood to be conventional to the extent not otherwise described herein. In this regard, this cooperating structure of the base member 24 for securing the inflatable restraint 12 to the vehicle may include a T-shaped attachment element 28 integrally formed with the base member 24.

The base member 24 may be unitarily stamped or otherwise formed of steel or other suitable material and may have a partially cylindrical shape defining a radius of curvature R. In this regard, the base member 24 may have a convexly curved inner surface for matingly contacting the inflatable restraint 12. As illustrated, the partially cylindrical shape may extend through no more than 180° such that the base member 24 may be positioned adjacent the inflatable restraint without a need to axially pass the base member 24 along the tubular portion 22 of the inflator.

In certain applications, the partially cylindrical shape of the base member 24 may extend through a range of 90° to 180°. In other certain applications, the particularly cylindrical shape may extend through approximately 180°. In the embodiment illustrated, the cylindrical shape may extend through approximately 160°-170°, and particularly through approximately 160°. The base member 24 has a circumferentially extending dimension.

The base member 24 further includes an axially extending length. The axially extending length may be greater than the radius of curvature. The axially extending length may be greater than a circumferentially extending dimension of the base member.

Certain dimensions of the base member 24 will depend on corresponding dimensions of the inflator 16 such that a compatible interface is provided. In one particular example, the base member 24 may have a radius of curvature R of approximately 22 mm, a circumferential dimension of 60 mm and an axial length of approximately 500 mm. In another particular example, the base member 24 may have a radius of curvature R of approximately 12 mm, a circumferential dimension of 33 mm and an axial length of approximately 100 mm.

The retention member may be a wire or cable hoop clamp 26. The wire or cable hoop 26 may be partially circular in shape and may include first and second ends 26A and 26B. The wire or cable hoop 26 and the base member 24 may cooperate to define a circular opening for receiving the inflator 16 and the airbag 12. The term "circular" will be understood to be broader than perfectly circular. In this regard, circular will be understood to be generally circular and sufficient to secure the airbag 12 to the inflator 16. The wire hoop 26 may be formed of low carbon steel, stainless steel, plastic or other suitable material.

The first and second ends 26A and 26B of the wire or cable hoop 26 may be secured to the base member 24. As illustrated, the first and second ends 26A and 26B of the wire or cable hoop 26 may be secured to an outer surface of the base member. In this regard, the base member 24 may include first and second pairs of crimp ears 30A and 30B for respectively crimping the first and second ends 26A and 26B of the wire or cable hoop 26. The first and second pairs of crimp ears 30A and 30B may be integrally formed with the base member 24. It will be appreciated that the first and second ends 26A and 26B of the wire or cable hoop 26 may be secured to the base member 24 in any other manner well known in the art.

Figure 4:
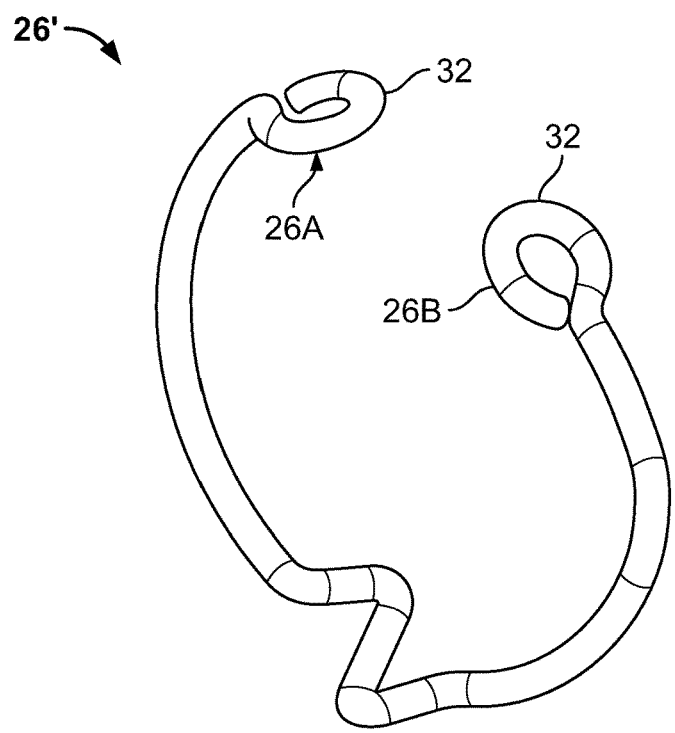
FIG. 4 is a perspective view of an alternative clamp hoop in accordance with the present teachings.

Turning to FIG. 4, an alternative retention member 26 is illustrated. To the extent not otherwise described, the retention member 26' will be understood to be similar to retention member 26. Thus, similar reference characters will be used to identify similar elements. The retention member 26' may be formed such that the first and second ends 26A and 26B include loops 32. The retention member 26' may also be formed as a tension spring to manage airbag cushion compression over time.

Figure 5:
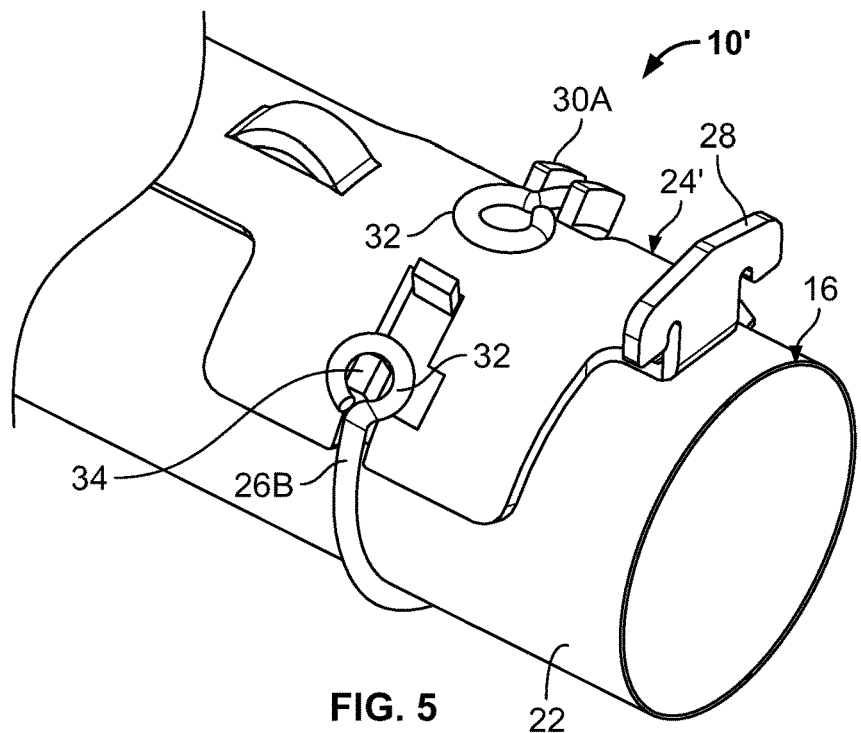
FIG. 5 is a perspective view similar to FIG. 2, illustrating a clamping arrangement that includes the alternative clamp hoop of FIG. 4 and a modified base member.

With reference to FIG. 5, a modified clamping arrangement in accordance with the present teachings is illustrated and identified at reference chamber 10'. To the extent not otherwise described, arrangement 10' will be understood to be similar to arrangement 10. Thus, similar reference characters will be used to identify similar elements.

The clamping arrangement 10' of FIG. 5 incorporates the wire or cable hoop 26' of FIG. 4. The arrangement 10' includes a base element 24' with a single pair of clamp ears 30A. The clamp ears 30A clamp the first end 26A of the wire hoop 26'. The base element 24' is shown to further include an integrally formed projection 34 received within an opening defined by the loop 32 at the second end 26B.

Figure 6:
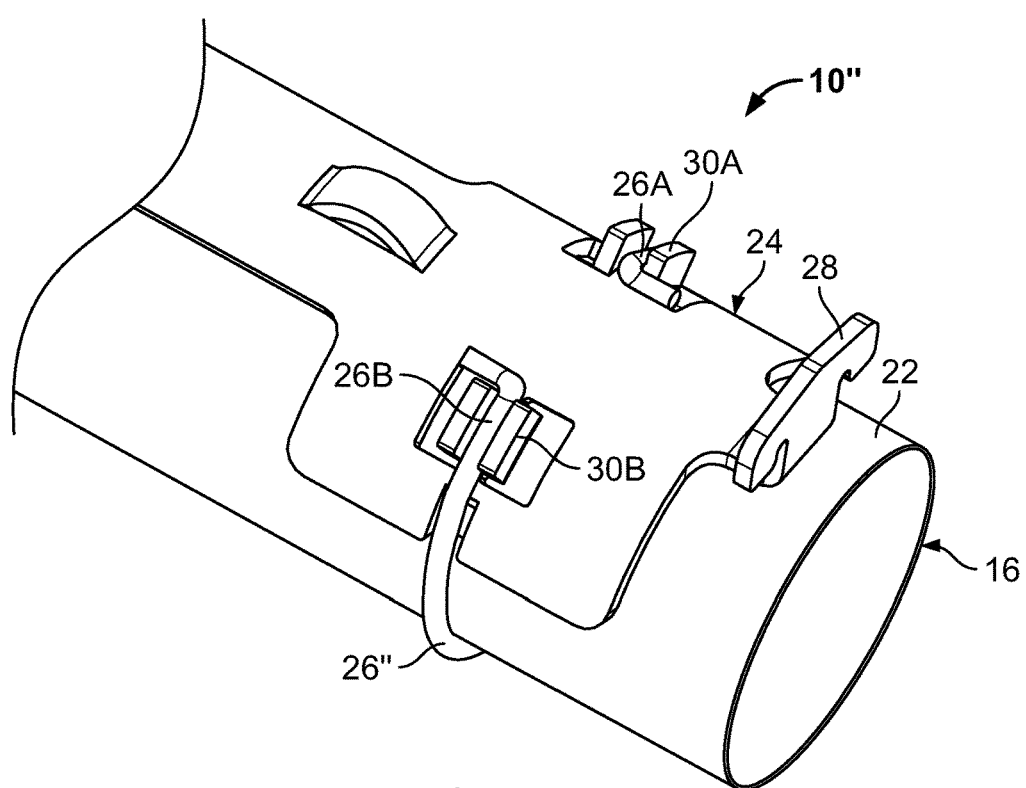
FIG. 6 is another perspective view similar to FIG. 2, the clamping arrangement illustrated to include another alternative clamp hoop.

With reference to FIG. 6, another clamping arrangement in accordance with the present teachings is illustrated and identified at reference chamber 10". To the extent not otherwise described, arrangement 10" will be understood to be similar to arrangement 10. Thus, similar reference characters will be used to identify similar elements.

The arrangement 10" is shown to incorporate an alternative clamp loop 26". In this embodiment, the first and second ends 26A and 26B of the clamp hoop 26" may be L-shaped. As with the arrangement 10, the first and second ends 26A and 26B of the clamp hoop 26" may be clamped by the first and second pairs of clamp ears 30A and 30B, respectively. The L-shaped ends 26A and 26B may provide further resistance against the ends 26A and 26B separating from the base member 24.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An inflatable restraint for a motor vehicle comprising:
an airbag defining an inflatable cavity having a cylindrical portion in fluid communication with the inflatable cavity;
an inflator for delivering a gas to the inflatable cavity, the inflator including a tubular portion inserted into the cylindrical portion of the airbag;
a base member having a partially cylindrical shape extending circumferentially through no more than 180°; and
a retention member including first and second ends secured to an outer surface of the base member, the retention member cooperating with the base member for securing an airbag of the inflatable restraint to an inflator,
wherein the base member is unitarily formed to include a first portion for receiving the first end of the retention member and a second portion for receiving the second end of the retention member.

2. The inflatable restraint for a motor vehicle of claim 1, wherein the retention member includes an inner concavely curved surface and an outer concavely curved surface.

3. The inflatable restraint for a motor vehicle of claim 1, wherein the partially cylindrical shape extends through an approximate range of 90° to 180°.

4. The inflatable restraint for a motor vehicle of claim 1, wherein the partially cylindrical shape extends through approximately 180°.

5. The inflatable restraint for a motor vehicle of claim 1, wherein the first and second portions of the base member are circumferentially spaced apart such that the first and second ends are spaced apart.

6. The inflatable restraint for a motor vehicle of claim 1, wherein the partially cylindrical shape has a radius of curvature and an axially extending length, the axially extending length being greater than the radius of curvature.

7. The inflatable restraint for a motor vehicle of claim 6, wherein the axially extending length is greater than a circumferentially extending dimension of the base member.

8. The inflatable restraint of claim 1, wherein at least one of the first and second portions clamps the respective one of the first and second ends.

9. The inflatable restraint of claim 1, wherein the first portion is inelastically movable from a first position to a second position to secure the retention member.

10. An arrangement for securing an airbag to an inflator and mounting the airbag and inflator to a motor vehicle, the arrangement comprising:
a mounting bracket adapted for attachment to the motor vehicle, the mounting bracket having a partially cylindrical shape extending through no more than 180°; and
a retention member including first and second ends secured to the mounting bracket, the retention member and the mounting bracket cooperating to define a circular opening for receiving the airbag and the inflator,
wherein the mounting bracket is formed to define at least one pair of crimp ears, the at least one pair of crimp ears clamping at least one of the first and second ends of the retention member to the mounting bracket.

11. The arrangement for securing an airbag to an inflator of claim 10, wherein the partially cylindrical shape extends through an approximate range of 90° to 180°.

12. The arrangement for securing an airbag to an inflator of claim 10, wherein the partially cylindrical shape extends through approximately 180°.

13. The arrangement for securing an airbag to an inflator of claim 10, wherein the retention member is a wire or cable clamp hoop.

14. The arrangement for securing an airbag to an inflator of claim 10, wherein the partially cylindrical shape of the mounting bracket has an axially extending length greater than a radius of curvature.

15. The arrangement for securing an airbag to an inflator of claim 10, in combination with an airbag and an inflator, wherein a portion of the airbag and a portion of the inflator extends through the circular opening cooperatively defined by the retention member and the mounting bracket.

16. An inflatable restraint for a motor vehicle comprising:
an airbag defining an inflatable cavity having a cylindrical portion in fluid communication with the inflatable cavity;
an inflator for delivering a gas to the inflatable cavity, the inflator including a tubular portion inserted into the cylindrical portion of the airbag; and
a combined clamping and mounting arrangement for securing the airbag to the inflator and connecting the inflatable restraint to the motor vehicle, the arrangement including a base member and a retention member, the base member disposed adjacent the cylindrical portion of the airbag and partially circumferentially surrounds the cylindrical portion of the airbag and the tubular portion of the inflator, the retention member including first and second ends secured to the base member,
wherein the base member includes a first portion for receiving the first end of the retention member and a second portion for receiving the second end of the retention member.

17. The inflatable restraint of claim 16, wherein the first and second portions of the base member are circumferentially spaced apart such that the first and second ends are spaced apart.

18. The inflatable restraint of claim 16, wherein the base member has a partially cylindrical shape that extends through no more than 180°.

19. The inflatable restraint of claim 18, wherein the partially cylindrical shape extends through an approximate range of 90° to 180°.

20. The inflatable restraint of claim 18, wherein the partially cylindrical shape extends through approximately 180°.

21. The inflatable restraint of claim 18, wherein the partially cylindrical shape has a radius of curvature extending length, the axially extending length being greater than the radius of curvature.

22. The inflatable restraint of claim 16, wherein at least one of the first and second portions clamps the respective one of the first and second ends.

23. The inflatable restraint of claim 16, wherein the first portion is inelastically movable from a first position to a second position to secure the retention member.

24. An inflatable restraint for a motor vehicle comprising:
an airbag defining an inflatable cavity having a cylindrical portion in fluid communication with the inflatable cavity;
an inflator for delivering a gas to the inflatable cavity, the inflator including a tubular portion inserted into the cylindrical portion of the airbag;
a base member having a partially cylindrical shape extending circumferentially through no more than 180°; and
a retention member including first and second ends secured to an outer surface of the base member, the retention member cooperating with the base member for securing an airbag of the inflatable restraint to an inflator, the base member is unitarily formed to include a first portion for receiving the first end of the retention member and a second portion for receiving a second end of the retention member, the first portion inelastically movable from a first orientation to a second orientation to secure the retention member.

* * * * *